United States Patent
Willoughby et al.

(10) Patent No.: US 11,755,503 B2
(45) Date of Patent: Sep. 12, 2023

(54) PERSISTING DIRECTORY ONTO REMOTE STORAGE NODES AND SMART DOWNLOADER/UPLOADER BASED ON SPEED OF PEERS

(71) Applicant: STORJ LABS INTERNATIONAL SEZC, Atlanta, GA (US)

(72) Inventors: Jacob Geoffrey Willoughby, Kaysville, UT (US); Thomas Colby Winegar, Draper, UT (US); Bryan Farrin Mangelson, American Fork, UT (US)

(73) Assignee: STORJ LABS INTERNATIONAL SEZC, Atlanta, GA (US)

( * ) Notice: Subject to any disclaimer, the term of this patent is extended or adjusted under 35 U.S.C. 154(b) by 0 days.

(21) Appl. No.: 17/452,363

(22) Filed: Oct. 26, 2021

(65) Prior Publication Data
US 2022/0138118 A1    May 5, 2022

Related U.S. Application Data

(60) Provisional application No. 63/107,213, filed on Oct. 29, 2020.

(51) Int. Cl.
G06F 13/16    (2006.01)
(52) U.S. Cl.
CPC ................. G06F 13/161 (2013.01)
(58) Field of Classification Search
None
See application file for complete search history.

(56) References Cited

U.S. PATENT DOCUMENTS

| | | |
|---|---|---|
| 6,118,768 A | 9/2000 | Bhatia et al. |
| 7,610,348 B2 | 10/2009 | Kisley et al. |
| 7,685,126 B2 | 3/2010 | Patel et al. |
| 8,260,796 B2 | 9/2012 | Mendez |
| 8,825,856 B1 | 9/2014 | Breau et al. |
| 10,534,667 B2 | 1/2020 | Olds et al. |
| 2006/0174323 A1 | 8/2006 | Brown et al. |
| 2008/0208909 A1 | 8/2008 | Rowley |
| 2009/0225760 A1 | 9/2009 | Foti |
| 2010/0269008 A1 | 10/2010 | Leggette et al. |

(Continued)

OTHER PUBLICATIONS

Final Office Action received for U.S. Appl. No. 15/405,095, dated Jul. 2, 2020, 29 pages.

(Continued)

*Primary Examiner* — Scott C Sun
(74) *Attorney, Agent, or Firm* — WORKMAN NYDEGGER

(57) ABSTRACT

Remote storage management using linked directory objects that are persisted in one of a plurality of remote storages. A first directory object is generated to record addresses of a plurality of fragments of data, relational to identifiers of the plurality of fragments of data. In response to determining that an address of at least one of the plurality of fragments is changed, a second directory object is generated to record a changed address of the at least one fragment. An address of the second directory object is then recorded in the first directory object, associating the address of the second directory object with the previous address of the at least one fragment stored in the first directory object.

20 Claims, 13 Drawing Sheets

(56) References Cited

U.S. PATENT DOCUMENTS

| | | | |
|---|---|---|---|
| 2011/0110568 A1 | 5/2011 | Vesper et al. | |
| 2011/0153351 A1 | 6/2011 | Vesper et al. | |
| 2011/0161802 A1 | 6/2011 | Jia et al. | |
| 2011/0225451 A1 | 9/2011 | Leggette et al. | |
| 2013/0097170 A1 | 4/2013 | Flanagan | |
| 2013/0204849 A1 | 8/2013 | Chacko | |
| 2013/0246568 A1 | 9/2013 | Chesterfield | |
| 2013/0339407 A1 | 12/2013 | Sharpe et al. | |
| 2013/0346795 A1 | 12/2013 | Gladwin et al. | |
| 2014/0006465 A1 | 1/2014 | Davis et al. | |
| 2014/0068224 A1 | 3/2014 | Fan et al. | |
| 2014/0218517 A1 | 8/2014 | Kim et al. | |
| 2014/0250006 A1 | 9/2014 | Makhotin et al. | |
| 2015/0039645 A1 | 2/2015 | Lewis | |
| 2015/0220284 A1 | 8/2015 | Wright | |
| 2015/0378827 A1 | 12/2015 | Grube et al. | |
| 2016/0028607 A1 | 1/2016 | Weill et al. | |
| 2016/0165663 A1 | 6/2016 | Shanmugam et al. | |
| 2016/0344745 A1 | 11/2016 | Johnson et al. | |
| 2017/0346853 A1 | 11/2017 | Wyatt et al. | |
| 2018/0121285 A1 | 5/2018 | Olds et al. | |
| 2018/0124188 A1 | 5/2018 | Olds et al. | |
| 2018/0198862 A1 | 7/2018 | Olds et al. | |
| 2018/0356992 A1* | 12/2018 | Lamberts | G06F 3/068 |

OTHER PUBLICATIONS

International Search Report and Written Opinion received for PCT Patent Application No. PCT/US17/59364, dated Jan. 26, 2018, 7 pages.
Notice of Allowance received for U.S. Appl. No. 15/405,095, dated Apr. 6, 2021, 9 pages.

\* cited by examiner

| Peer | Slice 0 | Slice 1 | Slice 2 | Slice 3 | Slice 4 | Slice 5 |
|---|---|---|---|---|---|---|
| Peer 0 | t=0 (slow) | | | | | |
| Peer 1 | t=0 (fast) | t=1 (fast) | t=1 (fast) | | | |
| Peer 2 | t=0 (slow) | | | t=1 (slow) | | |
| Peer 3 | t=0 (slow) | | | | | |
| Peer 4 | t=0 (fast) | t=1 (fast) | t=1 (fast) | t=1 (fast) | t=2 (fast) | t=2 (fast) |
| Peer 5 | t=0 (slow) | | | | t=2 (fast) | t=2 (fast) |

| Peer | Slice 0 | Slice 1 | Slice 2 | Slice 3 | Slice 4 | Slice 5 |
|---|---|---|---|---|---|---|
| Peer 0 | t=0 (slow) | | | | | t=1 (slow) |
| Peer 1 | t=0 (fast) | t=1 (fast) | | | | |
| Peer 2 | t=0 (slow) | | t=1 (fast) | | | t=1 (slow) |
| Peer 3 | t=0 (slow) | t=1 (fast) | | | t=1 (slow) | |
| Peer 4 | t=0 (fast) | | t=1 (fast) | | t=1 (slow) | |
| Peer 5 | t=0 (slow) | | | | | |

| Peer | Slice 0 | Slice 1 | Slice 2 | Slice 3 | Slice 4 | Slice 5 |
|---|---|---|---|---|---|---|
| Peer 0 | t=0 (slow) | t=1 (slow) | | | | |
| Peer 1 | t=0 (fast) | t=1 (fast) | t=1 (fast) | t=1 (fast) | t=2 (slow) | t=2 (fast) |
| Peer 2 | t=0 (slow) | | t=1 (slow) | | t=2 (fast) | t=2 (slow) |
| Peer 3 | t=0 (slow) | | | t=1 (slow) | | |
| Peer 4 | t=0 (fast) | t=1 (fast) | t=1 (fast) | t=1 (fast) | t=2 (fast) | t=2 (fast) |
| Peer 5 | t=0 (slow) | | | | | |

PERSISTING DIRECTORY ONTO REMOTE STORAGE NODES AND SMART DOWNLOADER/UPLOADER BASED ON SPEED OF PEERS

CROSS-REFERENCE TO RELATED APPLICATIONS

This application claims priority to U.S. Patent Application No. 63/107,213, entitled "PERSISTING DIRECTORY ONTO REMOTE STORAGE NODES AND SMART DOWNLOADER/UPLOADER BASED ON SPEED OF PEERS," filed on Oct. 29, 2020. The entire contents of each of the aforementioned applications and/or patents are incorporated by reference herein in their entirety.

BACKGROUND

Cloud storage is a model of computer data storage in which the digital data is stored in logical pools. The physical storage may span multiple servers (sometimes in multiple locations), and the physical environment is typically owned and managed by a hosting entity. These cloud storage providers are responsible for keeping the data available and accessible, and for protecting and running the physical environment. People and organizations buy or lease storage capacity from the providers to store user, organization, or application data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Some of the embodiments described herein are related to remote storage management using linked directory objects that may be implemented in a computing system or polycloud service server (hereinafter, also referred to as "the computing system" or "the service").

First, a first directory object is generated to record addresses of a plurality of fragments of data. Each of the plurality of fragments of data (hereinafter, also referred to as "fragments") is stored at least one of a plurality of remote storage nodes (hereinafter, also referred to as "node" or "storage node"). When an address of at least one of the plurality of fragments is changed, a second directory object is generated to record a changed address of the fragment. An address of the second directory object is recorded in the first directory object, associating the address of the second directory object with the previous address of the at least one fragment stored in the first directory object. In some embodiments, the address of the second directory object includes (1) an offset of the second directory object relative to the first directory object and (2) a length of the second directory object.

In some embodiments, the first directory object and the second directory object are stored in at least one of the plurality of remote storage nodes. In some embodiments, the computing system downloads a copy of the first directory object and the second directory object from the at least one remote storage node into a random-access memory (RAM) coupled to the computing system. The computing system uses the copy loaded into the RAM to retrieve data stored in at least one of the plurality of fragments.

In some embodiments, the determining of an address of at least one of the plurality of fragments being changed includes receiving a request to store a new dataset or update an existing dataset stored in the at least one of the plurality of fragments, retrieving an address of the at least one of the plurality of fragments based on the copy of the first directory object and the second directory object loaded into the RAM, and causing the new file to be stored or the existing file to be uploaded into the at least one of the plurality of fragments. In response to storing the new dataset or updating the existing dataset, the computing system determines that the address of the at least one of the plurality of fragments is changed, and the second directory object is generated.

In some embodiments, the second directory object is generated in the RAM, and the first directory object loaded in the RAM is updated to include the address of the second directory object generated in the RAM. The updated first directory object and the second directory object are then persisted into the at least one of the plurality of remote storage nodes, which may be performed at a predetermined frequency, or as needed.

In some other embodiments, the computing system generates a directory object to record addresses of a plurality of fragments of data, each of which is stored in at least one of a plurality of remote storage nodes. The directory object has a generation indicator, indicating a version or generation of the directory object. The directory object is appended to an end of each of the plurality of fragments of data. Further, the computing system generates a mapping between an identifier of each of the plurality of fragments of data and a generation indicator of a directory object appended at the end of the corresponding fragment of data and stores the mapping in a storage local to the computing system.

In some embodiments, the computing system is caused to update the appended directory object at each one of the plurality of fragments at a predetermined frequency. When a directory object at each one of the plurality of fragments of data is updated, the generation indicator of the directory object stored at the corresponding fragment is updated to a next generation. In some embodiments, the computing system stores each generation's directory object for a predetermined period of time locally in a storage coupled to the computing system.

In some embodiments, the generating of the mapping includes generating a bloom filter that is configured to predict whether a copy of the directory object stored in each fragment is up to date. The computing system is caused to send the bloom filter to each of the plurality of remote storage nodes. When a remote storage node receives the bloom filter, the remote storage is caused to traverse each of the directory objects contained in each fragment stored in the remote storage node and determine whether any one of the directory objects is not up to date. When at least one of the directory objects (that is not up to date) is found, the remote storage node sends a notification to the computing system. In response to receiving a notification, notifying that at least one directory object is not up to date, the computing system updates the at least one directory object, including updating the generation indicator of the at least one directory object to a current generation. After that, the computing system updates the mapping to reflects the updated generation indicator of the at least one directory object stored at a corresponding fragment, having a corresponding fragment ID. When a bloom filter is used, the bloom filter is also updated based on the update of the directory object corresponding to the fragment.

In some embodiments, the sending of the bloom filter is performed at a predetermined frequency. In some embodiments, the sending of the bloom filter is performed using a gossip data dissemination protocol that causes each storage node to disseminate the bloom filter to one or more other storage nodes directly.

Some other embodiments described herein are related to a downloader and/or an uploader configured to download from or upload to one or more fragments of data stored in a plurality of remote storage nodes (also referred to as "peers"), especially when a same fragment is stored (or to be stored) at multiple remote storage nodes.

After the computing system receives an indication of downloading a fragment of data stored in a plurality of remote storage nodes, the computing system divides the fragment of data into a plurality of slices and requests a first slice among the plurality of slices from each of the plurality of remote storage nodes. Based on each remote storage node's response to the requesting of the first slice, a download speed for each of the plurality of remote storage nodes is determined. Based on the determined download speed of each of the plurality of remote storage nodes, the computing system then determines which one or more remote storage nodes is to be requested to provide a next slice of data to achieve a reliable overall download speed. Then, the next slice of data is requested from the determined one or more remote storage nodes.

In some cases, the determined one or more remote storage nodes for requesting the next slice of data are one or more remote storage nodes that have the fastest download speeds among the plurality of remote storage nodes. In some cases, the determined one or more remote storage nodes for requesting the next slice of data are one or more remote storage nodes that do not have the fastest download speeds. In some cases, the determined one or more remote storage nodes includes at least one of the one or more remote storage nodes that have the fastest download speeds, and at least one of the one or more remote storage nodes that do not have the fastest download speeds.

In some embodiments, the computing system determines a download speed of each of the plurality of remote storage nodes at a predetermined frequency. Based on a most recent download speed of each of the plurality of remote storage nodes, the computing system determines at least one of the following (1) which one or more remote storage nodes is to be requested to provide a next slice of data, or (2) whether at least one remote storage node is to be added to or removed from a previously requested one or more remote storage nodes for a slice of data. In response to the determination, the computing system requests the next slice of data from the determined one or more remote storage nodes, and/or add or remove the determined at least one remote storage node from the previously requested one or more remote storage nodes for the slice of data.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIGS. 4A-4C illustrate several example embodiments of a smart downloader for optimizing an overall download speed or reliability of downloading a block of data from multiple remote storage nodes;

DETAILED DESCRIPTION

Cloud storage services may be accessed through a cloud computing service, a web service application programming interface (API), or by applications that utilize the API, such as cloud desktop storage, a cloud storage gateway, or web-based content management systems. AWS, Azure, and Google Cloud are a few examples of cloud storage services.

Due to the intensely competitive nature of the cloud storage services, the concept of polycloud has emerged. The concept of polycloud is to develop a customized cloud solution by using multiple vendors depending on the customer's needs, such that the customized cloud solution can leverage the differences of different service providers rather than comprising with one service provider. For example, the customized cloud solution may use AWS for the bulk of a customer's services and infrastructure but use Google Cloud for its machine learning capabilities. However, a polycloud approach may add significant complexity, especially in how to orchestrate deployments across different cloud providers.

Linked Directory Objects

Some of the embodiments described herein are related to remote storage management using linked directory objects that may be implemented in a computing system or polycloud service server (hereinafter, also referred to as "the computing system" or "the service").

Figure 1A:
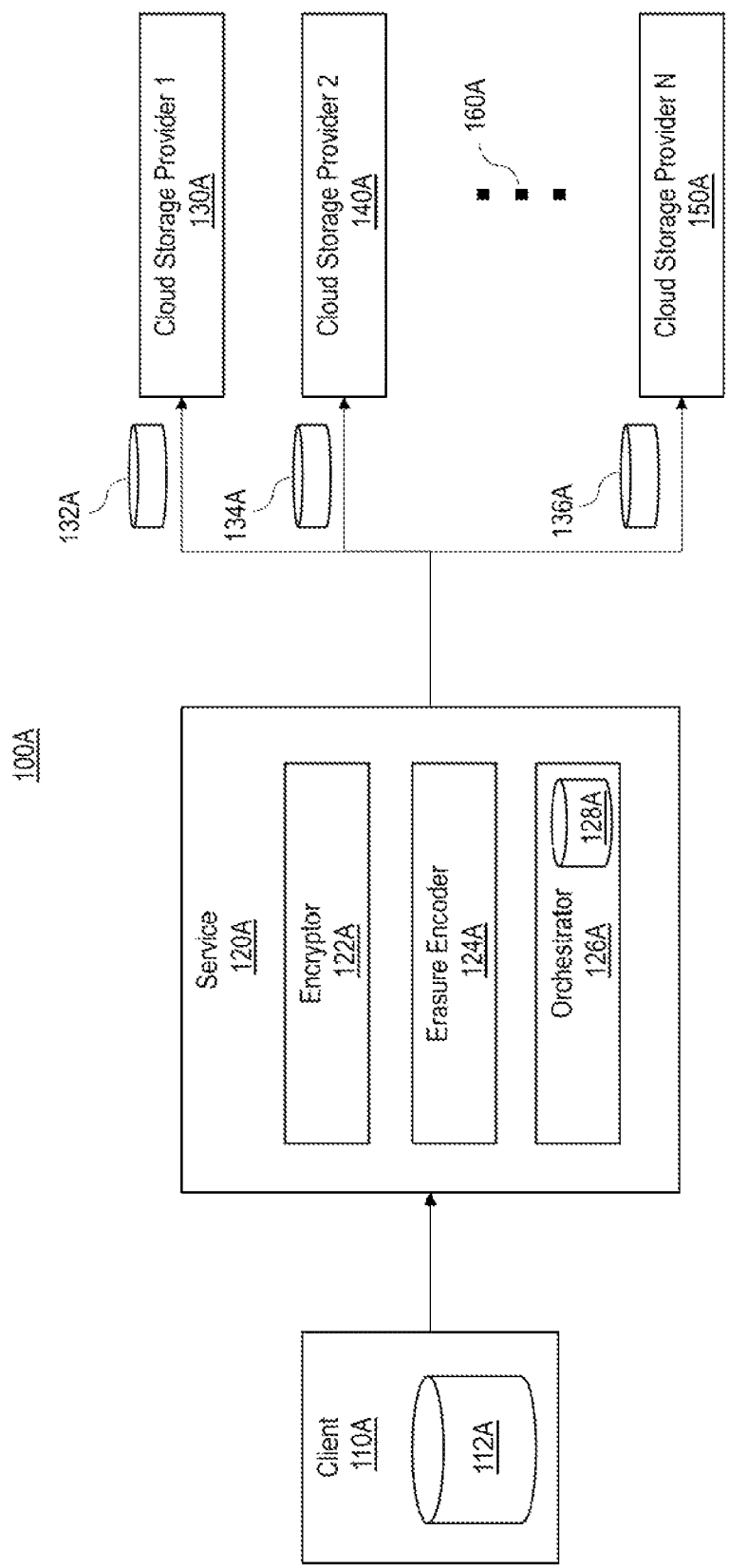
FIG. 1A is an example embodiment of sharding client data into multiple fragments and storing the multiple fragments in nodes of multiple cloud storage providers.

FIG. 1A illustrates an example environment 100A, in which a client 110A requests the service 120A to store the client's data 112A in a plurality of cloud service providers 130A, 140A, 150A. The ellipsis 160A represents that there may be any number N of cloud service providers that may be chosen to store a portion of the client's data 112A. The service 120A includes an encryptor 122A, an erasure encoder 124A and an orchestrator 126A. The encryptor 122A is configured to encrypt the client's data 112A. The erasure encoder 124A is configured to break (also referred to as "shard") the encrypted data into a plurality of fragments 132A, 134A, 136A. In some embodiments, the erasure encoder 124A also expands and encodes each of the plurality of fragments 132A, 134A, 136A with redundant data pieces. The encryption and sharding by the service 120A provide enhanced security and privacy to data owners.

Once the client's data 112A are encrypted and sharded into the plurality of fragments 132A, 134A, 136A, the orchestrator 126A is configured to determine which cloud storage provider 130A, 140A, 150A is to be used to store each of the plurality of fragments 132A, 134A, 136A. Once the orchestrator 126A makes the determination, each of the fragments 132A, 134A, 136A is then sent to the corresponding cloud storage provider for storing. As illustrated in FIG. 1A, the fragment 132A is stored in cloud storage provider 1 130A, the fragment 134A is stored in cloud storage provider 2 140A, and the fragment 136A is stored in the cloud storage provider N 150A. At the same time, the orchestrator 126A also records the location of each fragment in a directory 128A, such that when the client 110A needs to use its data 112A again, the service 120A can retrieve the data from the plurality of cloud storage providers 130A, 140A, 150A.

Figure 1B:
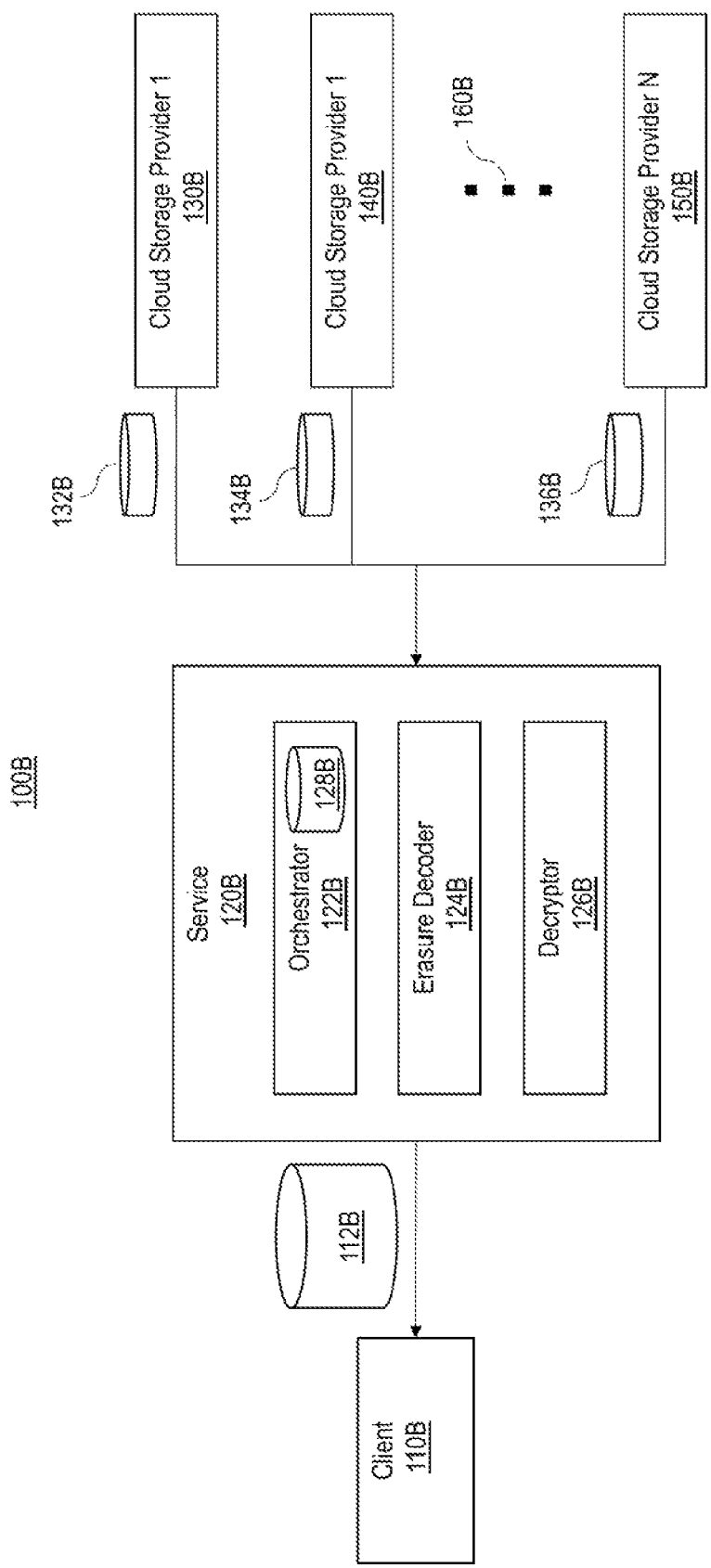
FIG. 1B is an example embodiment of accessing client data fragments stored in the nodes of the multiple cloud storage providers in response to receiving a request from the client.

FIG. 1B illustrates an example environment 100B, in which a client 110B requests the service 120B (corresponding to the service 120A of FIG. 1A) for previously-stored client's data 112B. The service 120B includes an orchestrator 122B (corresponding to the orchestrator 126A of FIG. 1A), an erasure decoder 124B, and a decryptor 126B. When the service 120B receives the request from the client 110B, the orchestrator 122B uses the directory 128B (corresponding to the directory 128A of FIG. 1A) to find out where the client's data 112B are stored. In some embodiments, the orchestrator 122B also determines whether the same fragment has been stored in multiple cloud service providers and finds the most economical way to retrieve the fragment. As used herein, the "most economical" way to retrieve data may be calculated based upon the financial cost of accessing data from each cloud storage, the speed of accessing the data from each cloud storage, and/or other related considerations.

Based on the finding of the orchestrator 122B, the service 120B then retrieves a plurality of fragments 132B, 134B, 136B stored in a plurality of cloud storage providers 130B, 140B, 150B. As illustrated in FIG. 1B, the fragment 132B is retrieved from the cloud storage provider 1 130B, the fragment 134B is retrieved from the cloud storage provider 2 140B, and the fragment 136B is retrieved from the cloud storage provider N 150B. Receiving the plurality of the fragments 132B, 134B, 136B, the erasure decoder 124B is configured to put the plurality of fragments 132B, 134B, 136B back together into a single piece of encrypted data. The decryptor 126B is then configured to decrypt the single piece of encrypted data to recover the client's data 112B. The recovered client's data 112B is then sent to the client 110B.

Figure 1C:
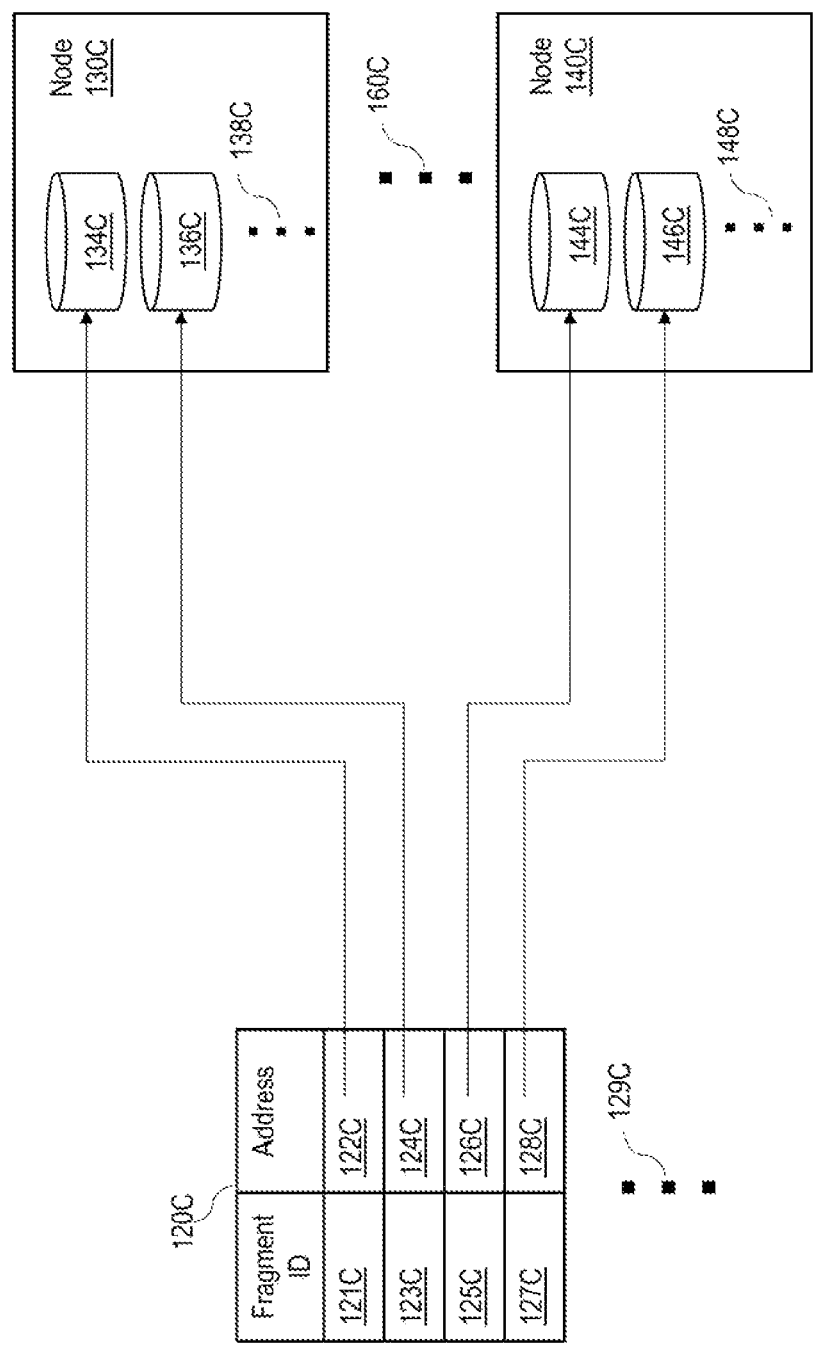
FIG. 1C illustrates an example embodiment of a directory object that is used to track addresses of the data fragments stored in the nodes of multiple cloud storage providers.

As briefly mentioned, the orchestrator 126A or 122B maintains a directory 128A or 128B of locations or addresses of data fragments. FIG. 1C illustrates an example embodiment of the directory 120C (corresponding to the directory 128A, 128B of FIG. 1A or 1B). The directory 120C may be stored in a data object (hereinafter also referred to as a directory object) As illustrated in FIG. 1C, the directory object 120C includes a fragment identifier that identifies each fragment and an address of where the corresponding fragment is stored. In at least one embodiment, the fragment identifier comprises a variable that is associated with the clients data 112$b$ and a variable indicating which fragment the fragment identifier is associated with. In some embodiments, the variable that is associated with the clients data 112$b$ comprises a hash of the clients data 112$b$. Each of node 130C and 140C is a remote storage node of a cloud storage provider. Each of node 130C and 140C stores multiple fragments of data 134C, 136C, 144C, 146C. The ellipsis 138C and 148C represent that there may be any number of fragments stored in node 130C or node 140C. In some cases, some of the fragments 134C, 136C, 144C, 146C may be generated from a same piece of client's data. In some cases, each of the fragments 134C, 136C, 144C, 146C may be generated from a different piece of same or different client's data.

As illustrated in FIG. 1C, the directory object 120C records: 1) that a fragment having a fragment ID 121C is stored in an address 122C, which points to the fragment 134C stored in node 130C; 2) that a fragment having a fragment ID 123C is stored in an address 124C, which points to the fragment 136C also stored in node 130C; and 3) that a fragment having a fragment ID 125C is stored in an address 126C, which points to the fragment 144C stored in node 140C, and so on. The ellipsis 129C represents that there may be any number of entries recorded in the directory 120C. In some embodiments, the orchestrator 126A, 122B of the computing system updates each record in the directory object 120C when an address of a fragment changes. However, such embodiments may cause the complete directory object to be stored and retrieved from a hard drive regularly, consuming a significant amount of resources.

In some embodiments, to reduce data transmission and/or data read and write resource consumption, the updated address entry may be stored in a new directory object. For example, when any entry of the directory object 120C is changed, a new directory object is generated, and the old directory object 120C is updated to record or point to an address of the new directory object. In some embodiments, the address of the new directory object may include an offset and a length of the new directory object.

Figure 2:
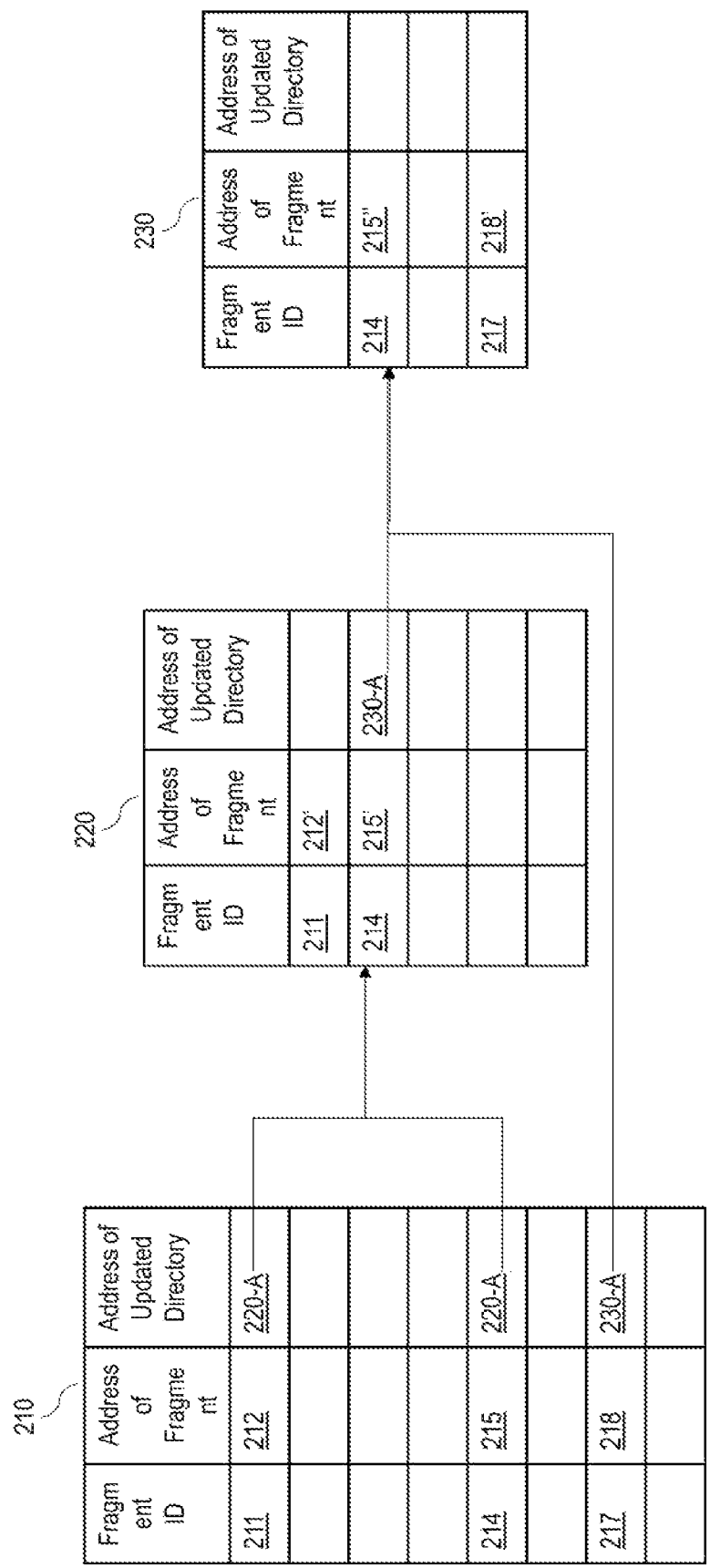
FIG. 2 illustrates an example embodiment of using linked directory objects to track addresses of the data fragments stored in the nodes of multiple cloud storage providers.

FIG. 2 illustrates an example embodiment, in which an old directory object 210 or 220 records an address of a new directory object 220 or 230 when an entry of the directory changes. As illustrated in FIG. 2, directory object 210 includes all the entries associated with all the fragments. When some of the entries in the directory object 210 are changed, a second directory object 220 is generated. Similarly, when some of the entries in the directory object 210 and/or 220 are changed, a third directory object 230 is generated.

For example, when entries associated with fragment IDs 211 and 214 are changed (i.e., the address of the fragment 212 having the fragment ID 211 is changed to 212', and the address of the fragment 215 having the fragment ID 214 is changed to 214'), the change is recorded in the second directory 220. At the same time, the address 220-A of the second directory 220 is recorded in the first directory object 210, corresponding to the entries associated with fragment IDs 211 and 214. In some embodiments, the original addresses (e.g., 215, 215') are left in the directory objects 210, 220 for the sake of versioning. For example, old versions of the fragments can be reverted to by referencing the older addresses.

In another example, after the above-described changes, when entries associated with fragment IDs 214 and 217 are changed (i.e., the address of the fragment 215' having the fragment ID 214 is changed again to 215", and the address of the fragment 218 having the fragment ID 217 is changed to 218'), the change is recorded in the third directory object 230. At the same time, the address 230-A of the third directory 230 is recorded in the first directory 210 and the second directory 220, corresponding to the entries associated with fragment IDs 214 and 217. Accordingly, in some embodiments, a single client data 112 may be associated with different unique fragments that are referenced by multiple different directories.

In some embodiments, the directory object(s) 120C, 210, 220, 230 may be stored in a local storage of the service 120A or 120B. In some embodiments, the directory object 120C, 210, 220, 230 may be stored or backed up in at least one node of the cloud storage providers 130A, 140A, 150A, 130B, 140B, 150B. In some embodiments, the service 120A or 120B downloads a copy of the directory object 120C into its random-access memory (RAM), and use the copy loaded into the RAM to perform recording and retrieval functions. In such a case, the service 120A or 120B may upload (also referred to as persist) an updated copy of the directory object 120C to the at least one node of the cloud storage provider 130A, 140A, 150A, 130B, 140B, or 150B, which may be performed at a predetermined frequency (e.g., once a day, once an hour, etc.) or as needed.

Figure 3A:
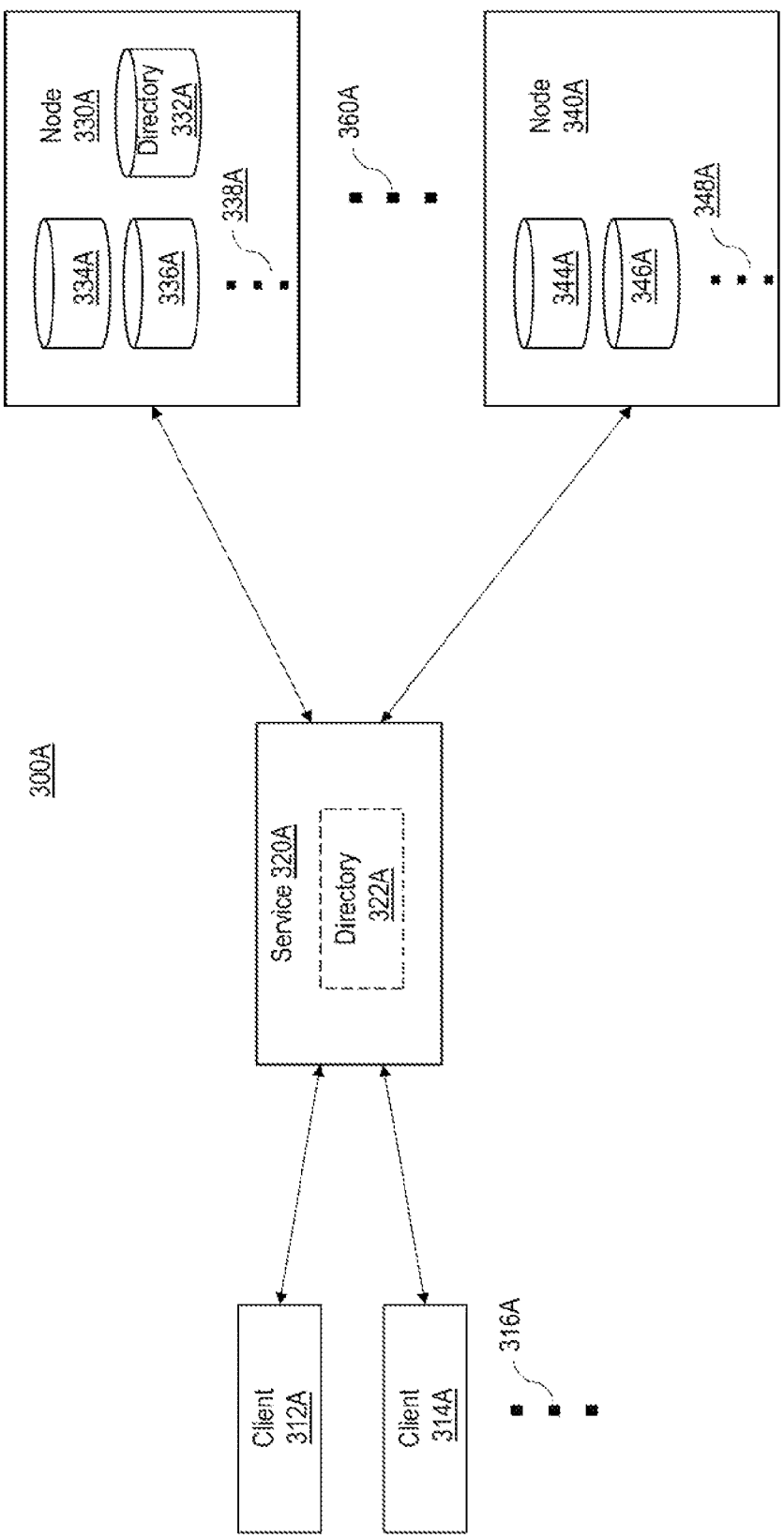
FIG. 3A illustrates an example environment, in which the directory object(s) is persisted onto one of the nodes of a cloud storage provider.

FIG. 3A illustrates an example environment 300A, in which the directory object(s) 322A are persisted in node 330A of a cloud storage provider. The service 320A downloads and loads a copy of the directory 332A in its RAM, shown in the dotted line. The directory 322A stored in the RAM of the service 320A is used to handle requests from clients 312A, 314A. Using an in-RAM copy of the directory object(s) 322A would allow the service 320A to provide fast data retrieval services. Further, using the linked directory objects allow the backup of only updated address entries, instead of uploading a whole directory objects constantly.

Appending Directory Object(s) to an End of Each of Multiple Fragments

Some of the embodiments described herein are related to persisting and appending the directory object to an end of each of the multiple fragments. In some embodiments, the directory object is persisted to each of the fragments stored in each storage node of the cloud storage provider. As such, the directory object(s) 120C is backed up at an end of each fragment 134C, 136C, 144C, or 146C.

Figure 3B:
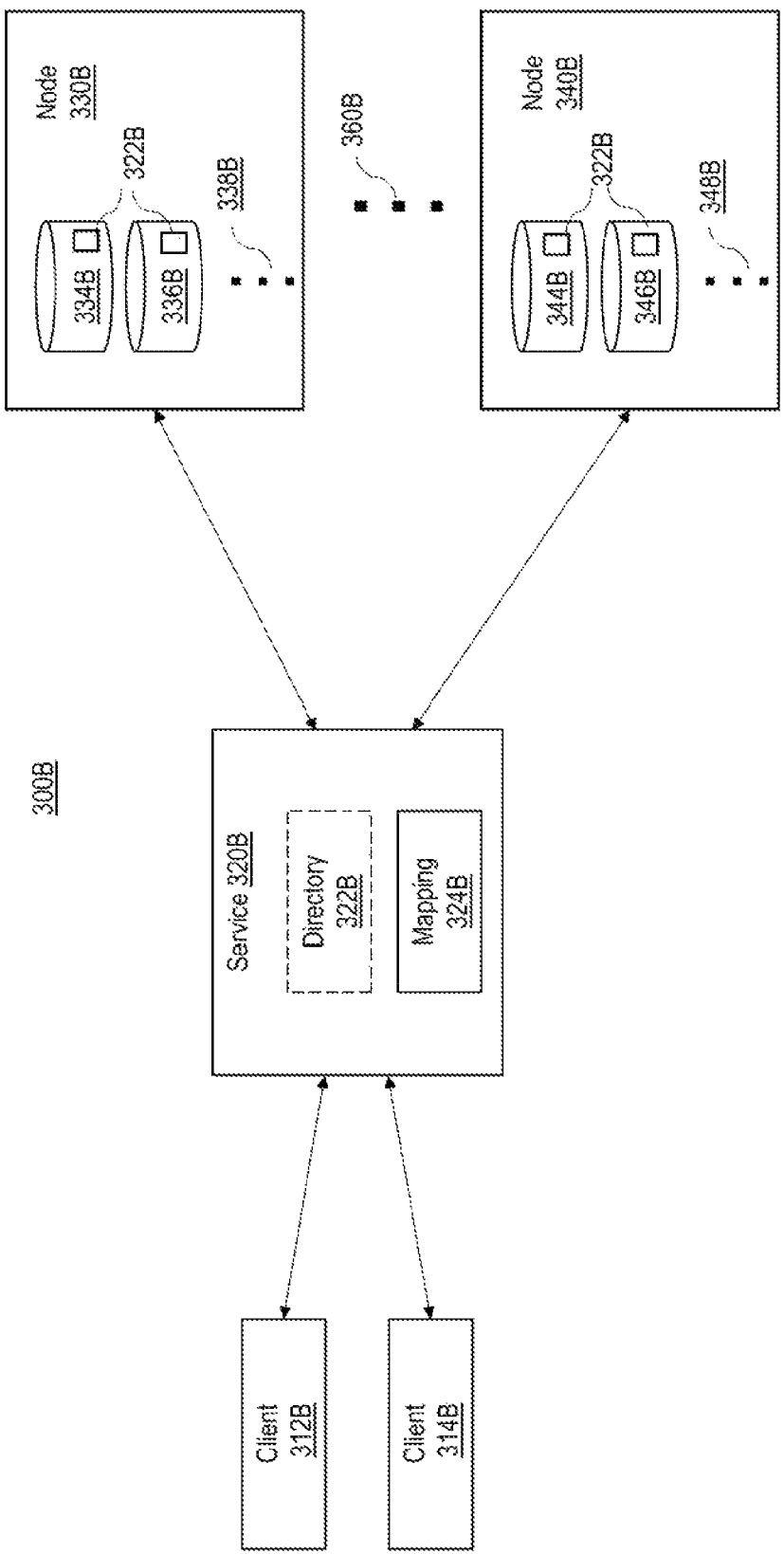
FIG. 3B illustrates an example environment, in which the directory object(s) is appended to each one of the fragments stored in the nodes of multiple cloud storages providers.

FIG. 3B illustrates an example environment 300B, in which the directory object 120C is persisted to each of fragments 334B, 336B, 344B, 346B. Since each of the fragments 334B, 336B, 344B, 346B contains a copy of the directory object 120C, which is constantly changing, some copies appended to some of the fragments may have been updated to the most recent copy, and some copies appended to some of the fragments may not have been updated to the most recent copy. As such, it is necessary to track which copy is up to date, and which copy is out of date. In some embodiments, the directory object(s) are associated with a generation indicator. When the directory object(s) 120C is updated, the generation indicator is updated to a next generation.

In some embodiments, to keep track of whether each copy appended to the end of each fragment has been updated to the most recent generation, the service 320B also generates and maintains a mapping 324B recording each fragment ID and the generation indicator of the copy stored in the fragment having the corresponding fragment ID.

In some embodiments, the mapping 324B includes a bloom filter. A bloom filter is a data structure designed to predict whether an element is present in a set in a very memory-efficient way. However, the cost paid for the memory-efficiency is that a bloom filter is a probabilistic data structure that tells that the element either definitely is not in the set or may be in the set.

In particular, a bloom filter is a bit vector that includes a plurality of bits. Here, the bloom filter is designed to tell whether a copy of the directory object appended to each fragment is up to date or not. To add an element to the bloom filter, the fragment ID is hashed into a number within the length of the bit vector of the bloom filter. For example, if the copy of the directory object appended to the fragment having the fragment ID is up to date, the bit of the hashed number in the bloom filter is set to 1; otherwise the bit of the hashed number in the bloom filter is set to 0. When each of the fragment ID is hashed and its status is set in the bloom filter, the bloom filter can be used to predict whether a particular fragment is up to date, i.e., has the most recent generation of the directory object.

Since the bloom filter is a probabilistic data structure, the result predicted by the bloom filter is not 100% accurate. In some embodiments, the service 320B may traverse each of the fragments in the bloom filter and update the fragments that are predicted as not updated to keep these fragments up to date. Alternatively, the service 320B may send the bloom filter to each of the storage nodes 330B and 340B and distribute the workload to each of the nodes 330B and 340B. The ellipsis 360B represents that there may be any number of storage nodes that store at least one fragment of at least one client.

When the storage node 330B or 340B receives the bloom filter, the node 330B or 340B is caused to traverse each of the fragments stored in itself and determine whether a copy appended to each fragment is up to date or not. In response to determining that at least one copy appended to at least one fragment is not up to date, the node 330B or 340B notifies the service 320B of the determination. In response to receiving the notification from at least one of the storage nodes 330B or 340B, the service 320B causes the at least one copy appended to the at least one node to be updated. Additionally, the mapping and/or the bloom filter is updated.

In some embodiments, the bloom filter is sent to each node 330B or 340B at a predetermined frequency. In some embodiments, the bloom filter is sent using a gossip data dissemination protocol (hereinafter, also referred to as a "gossip protocol"). A gossip protocol is a procedure or process of computer peer-to-peer communication that is based on the way epidemics spread. Eventually, the peer-to-peer gossip protocol can ensure that data is disseminated to all members of a group (i.e., all the storage nodes of the plurality of cloud storage providers). There are many variants of specific gossip protocols. In some embodiments, a gossip protocol may involve periodic, pairwise, inter-process interactions. In some embodiments, the frequency of the interactions is low compared to typical message latencies, so that the gossip protocol costs are negligible. In some embodiments, there is some form of randomness in the peer selection, and peers might be selected from a full set of nodes or from a smaller set of neighbors. Here, the gossip protocol may be used to disseminate the bloom filter from one storage node to one or more other storage nodes, such that the workload of the service is significantly reduced.

In some embodiments, the service 320B also stores the directory object of each generation locally in a storage coupled to the service 320B. In some embodiments, the service 320B stores the directory object of each generation for a predetermined period of time (e.g., a day, a week, a month, a year, etc.).

Smart Downloader/Uploader

As briefly discussed above, the service 320B may cause multiple copies of client's data to be stored at different locations. The service 320B may also store the directory object at different locations. Some of the embodiments described herein are related to a smart downloader and/or an uploader configured to download from or upload to a block or a fragment of data stored in a plurality of remote storage nodes (hereinafter also referred to as "peers") that may also be implemented at the service 120A, 120B or the orchestrator 126A, 122B of the computing system.

FIGS. 4A through 4C illustrate several example embodiments of the smart downloader. As illustrated in FIGS. 4A through 4C, a same piece of data (e.g., a fragment) is stored in 6 peers (including peers 0 through 5). When a request from a client is received for the piece of data, the service requests the piece of data from a plurality of slices (e.g., 6 slices, including slices 0 through 5). At the very beginning (i.e. t=0), the service requests a first slice of data (e.g., slice 0) from each of the 6 peers. Based on the response of each of the 6 peers, the service determines a download speed for each of the 6 peers. Based on the determined speed of each peer, the service can then determine a strategy of which peer should be used to download the rest of the slices. In some embodiments, the download speed of each peer is constantly determined at a predetermined frequency. In such a case, the service may adjust its determination based on the most current download speed of each peer.

For example, as illustrated in FIG. 4A, the service determined that peer 1 and peer 4 are fast at the beginning (i.e., t=0), thus, the service determines to use peers 1 and 4 to download the rest of the slices, until it is determined that peer 1 is no longer the fastest during the downloading of slice 3. In response to determining that peer 1 is no longer the fastest peer, the service stops using peer 1, and switches to a currently fastest peer, i.e., peer 2. As such, in the embodiment illustrated in FIG. 4A, the service constantly determines the current download speeds of the peers and uses only the fastest one or more peers, and the slower peers may not be used at all after the test downloading of the first slice.

FIG. 4B illustrates a different embodiment that utilizes all the peers, including the slow ones. As illustrated in FIG. 4B, the service uses the fastest peers (i.e., peers 1 and 4) to download slices 1-3; simultaneously, the service uses the slower peers 3 and 5 to download slice 4 and uses the slower peers 0 and 2 to download slice 5. Depending how slow peers 0, 2, 3 and 5 are, in some cases, this approach may yield a faster total download speed than the approach illustrated in FIG. 4A. For example, the download speed of peers 0, 2, 3, and 5 may have a download speed that is about 40% of the download speed of peers 1 and 4. In such a case, when the fast peers 1 and 4 finish downloading slices 1-3, the slow peers 0, 2, 3, and 5 also would have finished downloading slices 4 and 5. Thus, the overall download time would be less than that of using only fast peers 1 and 4 to download all the slices.

FIG. 4C illustrates another embodiment, in which two fast peers and at least one slow peer are always assigned to download each slice. This approach uses some slow peers and some fast peers to compensate for the possibility that the fast peers slow down, and the slow peers speed up during the download to ensure a reliable overall download speed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
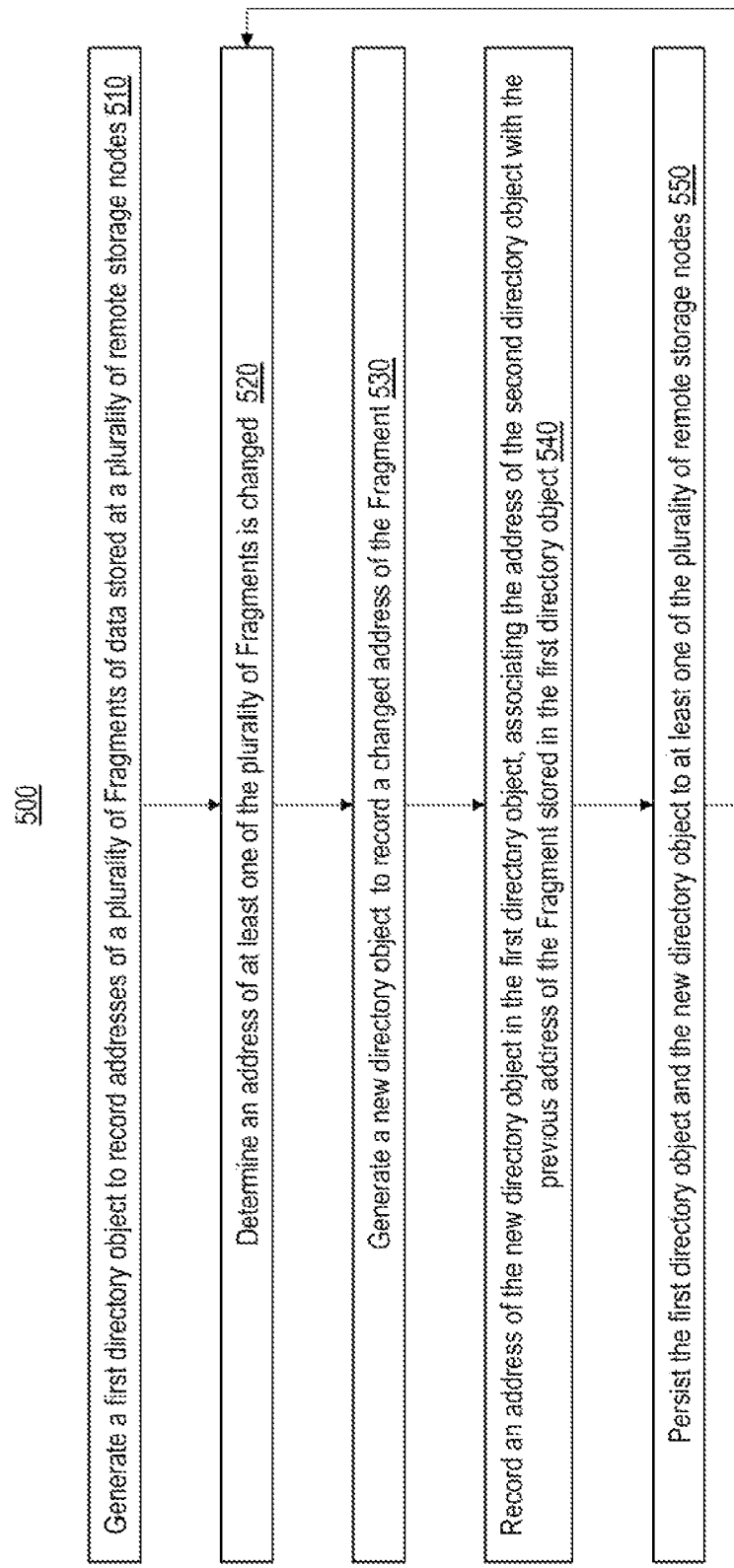
FIG. 5 illustrates a flowchart of an example method for generating and persisting directory objects onto at least one of the plurality of remote storage nodes.

FIG. 5 illustrates a flowchart of an example method 500 for generating and persisting linked directory objects onto at least one of the plurality of remote storage nodes, which may be implemented at a service 120A, 120B, 320A. The method 500 includes generating a first directory object to record addresses of a plurality of fragments of data stored at a plurality of remote storage nodes (510). In response to determining an address of at least one of the plurality of fragments is changed (520), the service generates a new directory object (e.g., a second directory object) to record a changed address of the fragment (530). Further, the service also records an address of the second directory object in the first directory object (540), associating the address of the second directory object with the previous address of the fragment stored in the first directory object. Finally, the service persists the first directory object and the second directory object to at least one of the plurality of remote storage nodes (550).

This process of actions 520 through 550 may repeat again, when a second address of at least one of the plurality of fragments is changed (510). A new directory object (e.g., a third directory object) is generated to record the second changed address. Again, an address (e.g., an offset and a length) of the third directory object is recorded in the first directory object and/or the second directory object, as illustrated in FIG. 2.

Figure 6:
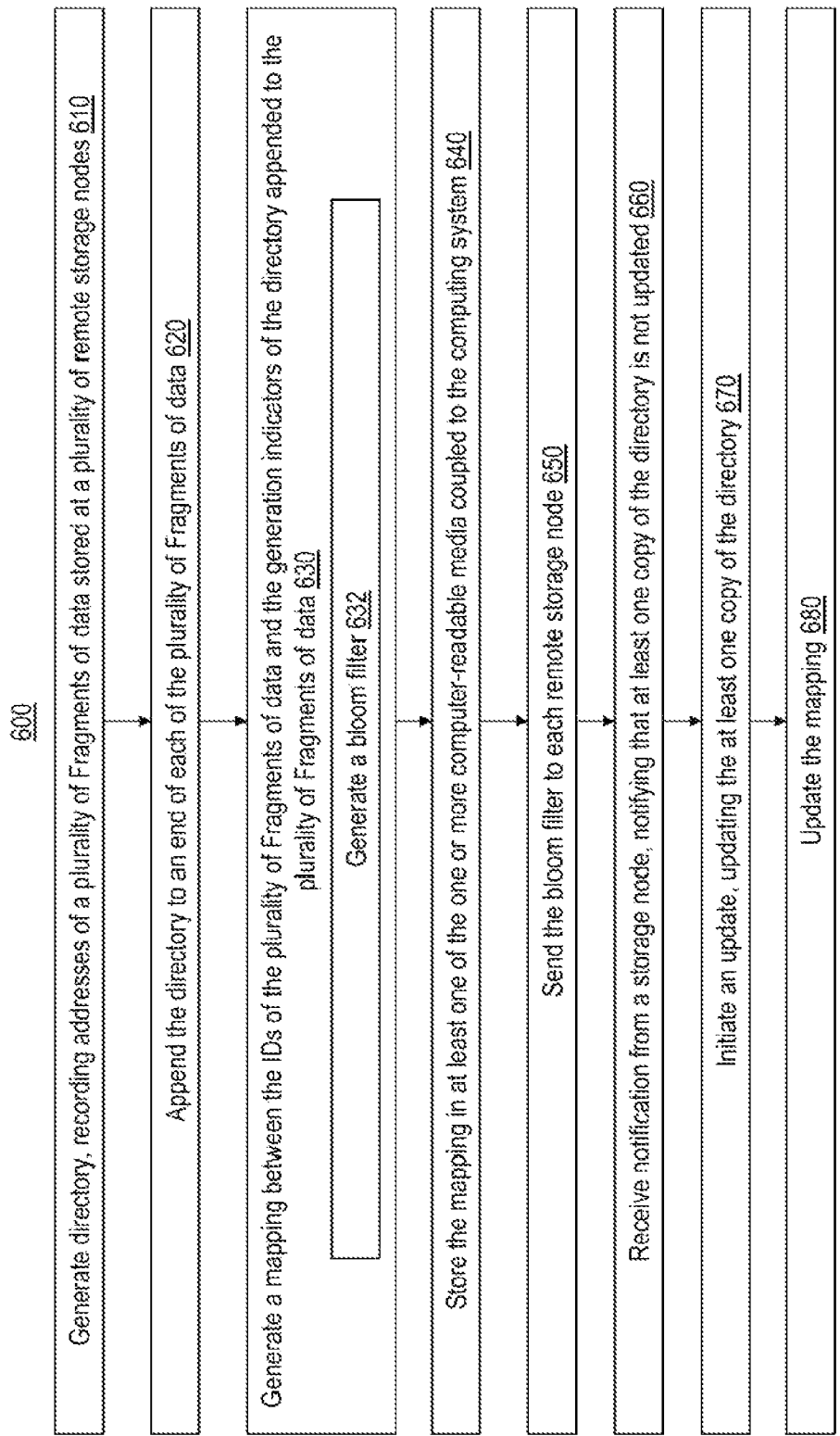
FIG. 6 illustrates a flowchart of an example method for persisting a directory object to an end of each fragment stored in different remote storage nodes.

FIG. 6 illustrates a flowchart of an example method 600 for persisting a directory to an end of each fragment stored in different remote storage nodes, which may also be performed by the service 120A, 120B, 320B. The method 600 includes generating a directory to record addresses of a plurality of fragments of data stored at a plurality of remote storage nodes (610). The directory may include a directory object 120C of FIG. 1C, or one or more linked directory object(s) 210, 220, 230 of FIG. 2 as described above. Alternatively, the directory may be structured in any other data structure. The directory has a generation indicator, indicating the generation or version of a copy of the directory. When the directory is updated, the generation indicator is also updated to reflect a next generation or version.

The method 600 also includes appending the directory to an end of each of the plurality of fragments of data (620). At the same time, the service generates a mapping between the identifiers of the plurality of fragments of data and the generation indicators of the directory objects appended to the plurality of fragments of data (630). In some embodiments, generating the mapping includes generating a bloom filter (632). The bloom filter is configured to predict whether a copy of the directory appended to each fragment is up to date. The mapping (including the bloom filter) is stored in at least one of the local storages coupled to the computing system (640).

The service then sends the bloom filter to each remote storage node (650). In some embodiments, the sending of the bloom filter may be performed at a predetermined frequency (e.g., once per day, once per week, etc.). In some embodiments, the sending the bloom filter may be performed using a gossip data dissemination protocol. When a storage node receives the bloom filter, the storage node is caused to use the bloom filter to traverse each set of the directory object(s) appended to each one of the data fragments stored at the storage node to determine whether each set of directory object is up to date. When a storage node determines that at least one set of the directory object(s) appended to some of the data fragments is not updated, the storage node sends a notification to the service. Receiving a notification from a storage node, notifying that at least one copy of the directory is not updated (660), the service then initiates an update to update the at least one copy of the directory (670). In response to a successful update, the service then updates its mapping (680), including the bloom filter.

Figure 7:
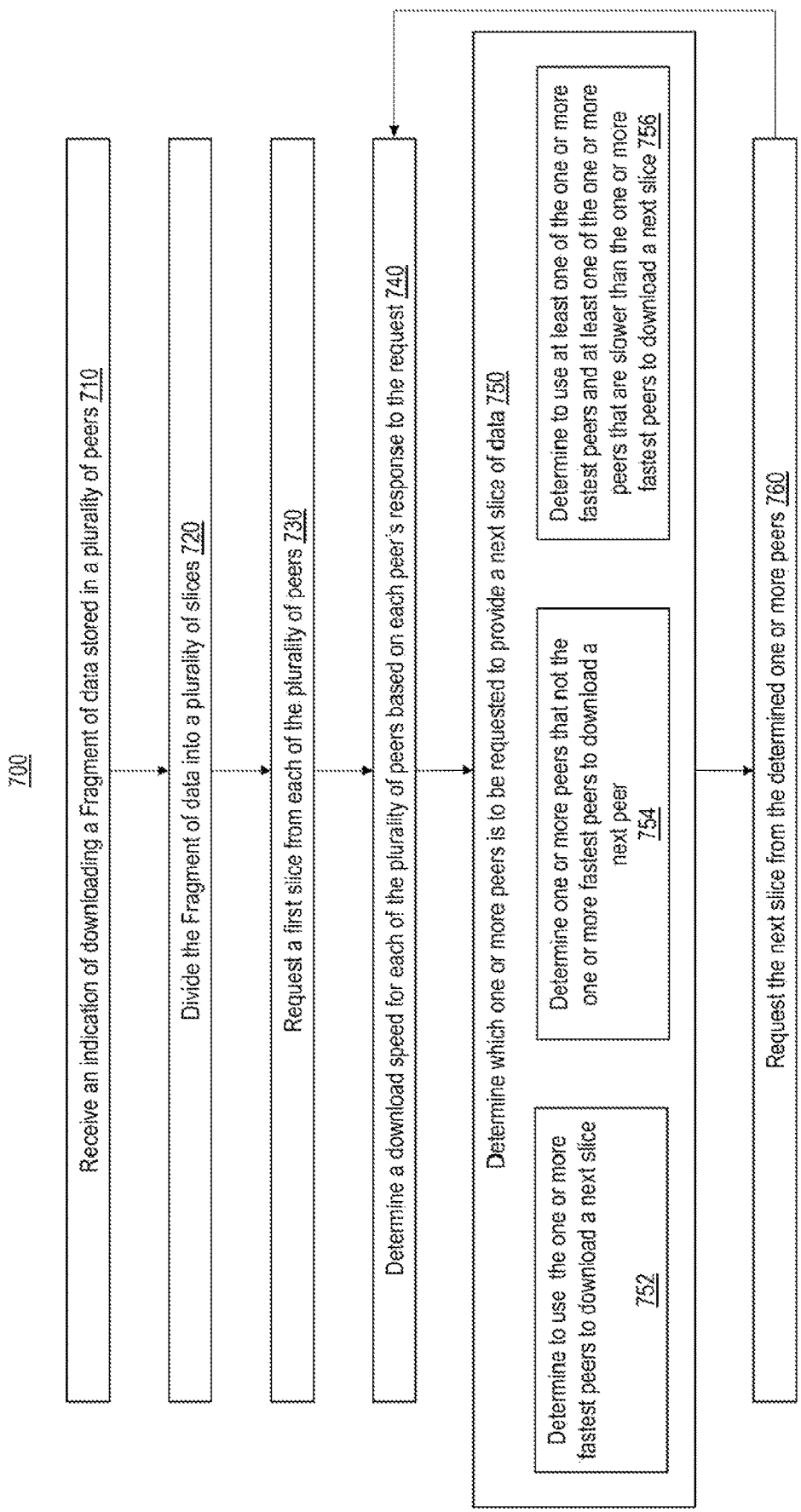
FIG. 7 illustrates a flowchart of an example method for downloading a fragment of data stored in a plurality of storage nodes.

FIG. 7 illustrates a flowchart of an example method 700 for downloading a fragment of data stored in a plurality of storage nodes (i.e., peers), which may also be performed by the service 120A, 120B, 320A, 320B or the orchestrator 126A, 122B. In some embodiments, the orchestrator 122B of FIG. 1B may be tasked to orchestrate the download using the method 700.

The method 700 includes receiving an indication for downloading a fragment of data stored in a plurality of peers (710). In some embodiments, the service divides the fragment of data into a plurality of slices (720) and request a first slice from each of the plurality of peers (730). Based on the response to the request for the first slice from each of the plurality of peers, the service then determines a download speed for each of the plurality of peers (740). Based on the determined download speeds of the peers, the service then determines which one or more peers is to be requested to provide a next slice of data to achieve a reliable or fast overall download speed (750). In some embodiments, the service determines to use the one or more fastest peers to download a next slice (752). In some embodiments, the service determines to use one or more peers that are not the fastest one or more fastest peers to download a next slice (754). In some embodiments, the service determines to use at least one of the one or more fastest peers and at least one of the one or more peers that are not the fastest to download a next slice (756). The service then requests the next slice from the determined one or more peers (760).

In some embodiments, the download speed of each peer is constantly determined at a predetermined frequency (e.g., every second, every minute, etc.). Based on the current download speeds, the service determines which one or more peers is to be requested to provide a next slice of data. In some embodiments, based on the current download speeds, the service may replace a slowed-down peer with a sped-up peer for any slice that is currently being downloaded. This process may repeat until all the slices of data are downloaded.

A similar strategy may be implemented in a smart uploader as well. For example, the orchestrator 126A of FIG. 1A may be tasked to orchestrate the upload of multiple fragments using the similar strategy. For example, multiple nodes are requested to upload a first fragment. Based on the response to the request for uploading the first fragment, an upload speed of each node is determined. Alternatively, each fragment may be divided into multiple slices, and multiple nodes are tried to upload a first slice of the fragment. The orchestrator 126A may then determine one or more nodes or peers are to be used to upload a next fragment/slice or the rest of the fragments/slices.

Finally, because the principles described herein may be performed in the context of a computing system (for example, each of the service 120A, 120B, client 110A, 110B, cloud storage providers 130A-150A, 130B-150B, and each storage node 130C, 140C, 330A, 340A, 330B, 340B of the cloud storage providers may include one or more computing systems) some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
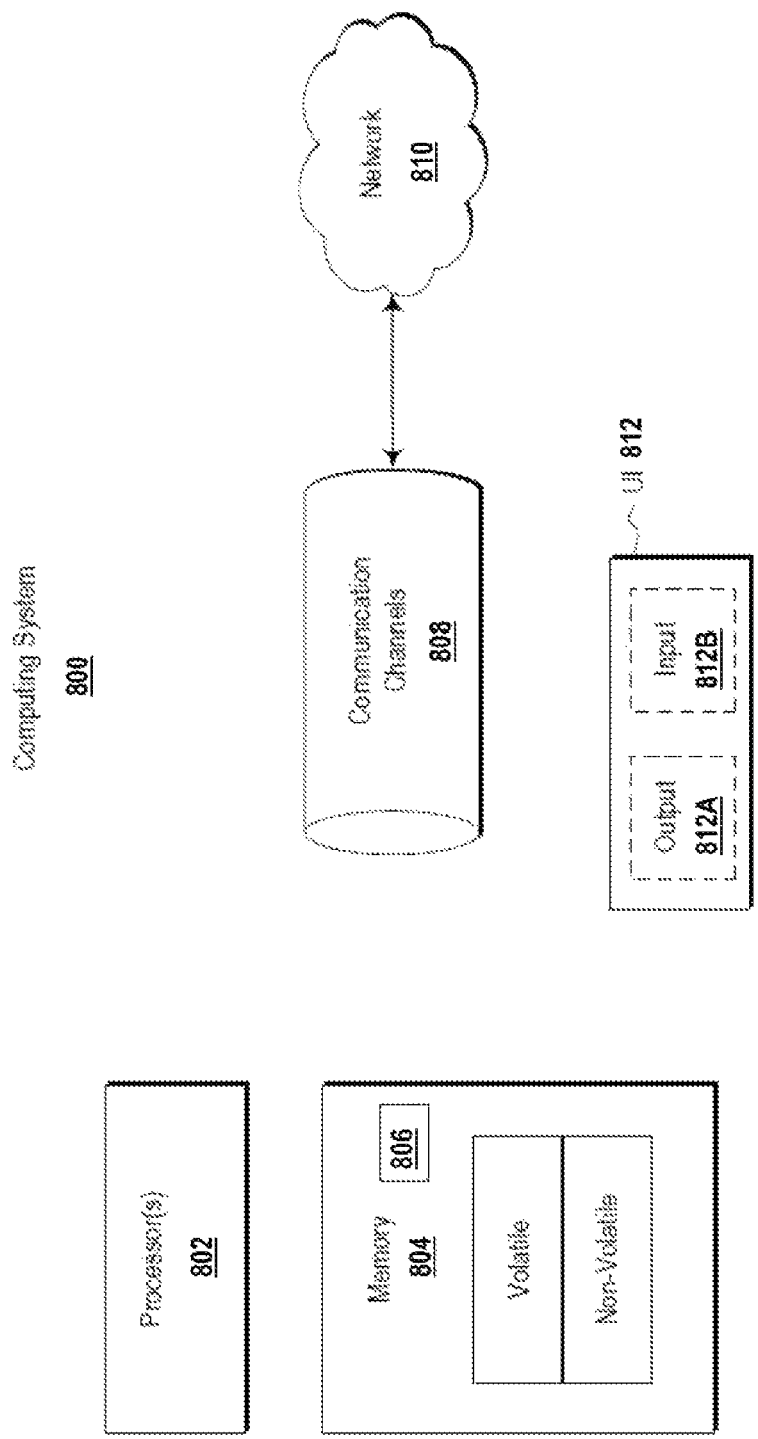
FIG. 8 illustrates an example computing system in which the principles described herein may be employed.

As illustrated in FIG. 8, in its most basic configuration, a computing system 800 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component". For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms and so forth. Examples of input mechanisms 8128 might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 800 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 802 and memory 804, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are structured such that, when executed by the one or more processors, cause the computing system to perform the following:
   receive a request to download a block of data stored in a plurality of remote storage nodes, wherein the block of data comprises a plurality of slices where each slice in the plurality of slices is stored at each of the plurality of remote storage nodes;
   access addresses for the plurality of slices from a directory object, wherein:
   the directory object comprises one or more addresses for each slice in the plurality of slices, and
   the directory object comprises an address for an updated directory object that comprises updated addresses for at least a portion of the plurality of slices;
   request a first slice among the plurality of slices from each of the plurality of remote storage nodes, wherein the request is directed towards addresses retrieved from the directory object;
   determine a download speed for each of the plurality of remote storage nodes based on each remote storage node's response to the request of the first slice;
   based on the determined download speed of each of the plurality of remote storage nodes, determine which one or more remote storage nodes is to be requested to provide a next slice of data to achieve a fastest overall download speed; and
   requests the next slice of data from the determined one or more remote storage nodes.

2. The computing system of claim 1, wherein the determining of which one or more remote storage nodes is to be requested to provide a next slice of data comprises:
   determining to request the next slice of data from one or more remote storage nodes that have fastest download speeds among the plurality of remote storage nodes.

3. The computing system of claim 1, wherein the determining of which one or more remote storage nodes is to be requested to provide a next slice of data comprises:
   determining to request the next slice of data from one or more remote storage nodes that do not have fastest download speeds among the plurality of remote storage nodes.

4. The computing system of claim 1, wherein the determining of which one or more remote storage nodes is to be requested to provide a next slice of data comprises:
   determining to request the next slice of data from at least one of one or more remote storage nodes that have fastest download speeds among the plurality of remote storage nodes and at least one of one or more remote storage nodes that do not have the fastest download speeds among the plurality of remote storage nodes.

5. The computing system of claim 1, the computing system further caused to:
   determine a download speed of each of the plurality of remote storage nodes at a predetermined frequency; and
   based on a most recent download speed of each of the plurality of remote storage nodes, determine at least one of the following: (1) which one or more remote storage nodes is to be requested to provide a next slice of data, or (2) whether at least one remote storage node is to be added to or removed from a previously requested one or more remote storage nodes for a slice of data.

6. The computing system of claim 5, the computing system further caused to:

request the next slice of data from the determined one or more remote storage nodes.

7. The computing system of claim 5, the computing system further caused to:
add or remove the determined at least one remote storage node from the previously requested one or more remote storage nodes for the slice of data.

8. A computing-implemented method, executed on one or more processors, for storing data, the method comprising:
receiving a request to download a block of data stored in a plurality of remote storage nodes, wherein the block of data comprises a plurality of slices where each slice in the plurality of slices is stored at each of the plurality of remote storage nodes;
accessing addresses for the plurality of slices from a directory object, wherein:
the directory object comprises one or more addresses for each slice in the plurality of slices, and
the directory object comprises an address for an updated directory object that comprises updated addresses for at least a portion of the plurality of slices;
requesting a first slice among the plurality of slices from each of the plurality of remote storage nodes, wherein the request is directed towards addresses retrieved from the directory object;
determining a download speed for each of the plurality of remote storage nodes based on each remote storage node's response to the request of the first slice;
based on the determined download speed of each of the plurality of remote storage nodes, determining which one or more remote storage nodes is to be requested to provide a next slice of data to achieve a fastest overall download speed; and
requesting the next slice of data from the determined one or more remote storage nodes.

9. The computing-implemented method of claim 8, wherein the determining of which one or more remote storage nodes is to be requested to provide a next slice of data comprises:
determining to request the next slice of data from one or more remote storage nodes that have fastest download speeds among the plurality of remote storage nodes.

10. The computing-implemented method of claim 8, wherein the determining of which one or more remote storage nodes is to be requested to provide a next slice of data comprises:
determining to request the next slice of data from one or more remote storage nodes that do not have fastest download speeds among the plurality of remote storage nodes.

11. The computing-implemented method of claim 8, wherein the determining of which one or more remote storage nodes is to be requested to provide a next slice of data comprises:
determining to request the next slice of data from at least one of one or more remote storage nodes that have fastest download speeds among the plurality of remote storage nodes and at least one of one or more remote storage nodes that do not have the fastest download speeds among the plurality of remote storage nodes.

12. The computing-implemented method of claim 8, further comprising:
determining a download speed of each of the plurality of remote storage nodes at a predetermined frequency; and
based on a most recent download speed of each of the plurality of remote storage nodes, determining at least one of the following: (1) which one or more remote storage nodes is to be requested to provide a next slice of data, or (2) whether at least one remote storage node is to be added to or removed from a previously requested one or more remote storage nodes for a slice of data.

13. The computing-implemented method of claim 12, further comprising:
requesting the next slice of data from the determined one or more remote storage nodes.

14. The computing-implemented method of claim 12, further comprising:
adding or removing the determined at least one remote storage node from the previously requested one or more remote storage nodes for the slice of data.

15. A computer-readable media comprising one or more physical non-transitory computer-readable storage media having stored thereon computer-executable instructions that, when executed at a processor, cause a computer system to perform a method for storing data, the method comprising:
receiving a request to download a block of data stored in a plurality of remote storage nodes, wherein the block of data comprises a plurality of slices where each slice in the plurality of slices is stored at each of the plurality of remote storage nodes;
accessing addresses for the plurality of slices from a directory object, wherein:
the directory object comprises one or more addresses for each slice in the plurality of slices, and
the directory object comprises an address for an updated directory object that comprises updated addresses for at least a portion of the plurality of slices;
requesting a first slice among the plurality of slices from each of the plurality of remote storage nodes, wherein the request is directed towards addresses retrieved from the directory object;
determining a download speed for each of the plurality of remote storage nodes based on each remote storage node's response to the request of the first slice;
based on the determined download speed of each of the plurality of remote storage nodes, determining which one or more remote storage nodes is to be requested to provide a next slice of data to achieve a fastest overall download speed; and
requesting the next slice of data from the determined one or more remote storage nodes.

16. The computer-readable media of claim 15, wherein the determining of which one or more remote storage nodes is to be requested to provide a next slice of data comprises:
determining to request the next slice of data from one or more remote storage nodes that have fastest download speeds among the plurality of remote storage nodes.

17. The computer-readable media of claim 15, wherein the determining of which one or more remote storage nodes is to be requested to provide a next slice of data comprises:
determining to request the next slice of data from one or more remote storage nodes that do not have fastest download speeds among the plurality of remote storage nodes.

18. The computer-readable media of claim 15, wherein the determining of which one or more remote storage nodes is to be requested to provide a next slice of data comprises:
determining to request the next slice of data from at least one of one or more remote storage nodes that have fastest download speeds among the plurality of remote storage nodes and at least one of one or more remote storage nodes that do not have the fastest download speeds among the plurality of remote storage nodes.

19. The computer-readable media of claim 15, further comprising:

determining a download speed of each of the plurality of remote storage nodes at a predetermined frequency; and based on a most recent download speed of each of the plurality of remote storage nodes, determining at least one of the following: (1) which one or more remote storage nodes is to be requested to provide a next slice of data, or (2) whether at least one remote storage node is to be added to or removed from a previously requested one or more remote storage nodes for a slice of data.

20. The computer-readable media of claim 19, the computing system further caused to:

request the next slice of data from the determined one or more remote storage nodes.

\* \* \* \* \*